Figure 1:
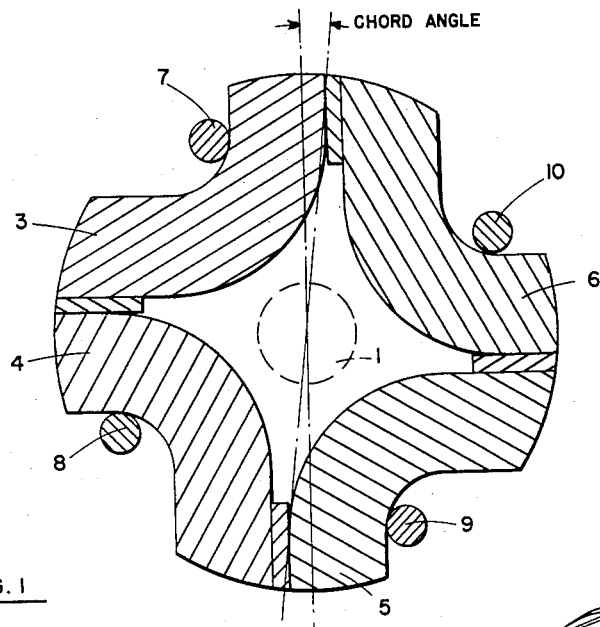

Jan. 20, 1959 J. V. WILLIFORD 2,870,352
ROTOR FOR ELECTRIC MOTOR
Filed Aug. 3, 1956 5 Sheets-Sheet 1

INVENTOR.
JACOB V. WILLIFORD
BY
Harold J. Downes
ATTORNEY

*INVENTOR.*
JACOB V. WILLIFORD
BY Harold J. Downes
ATTORNEY

Jan. 20, 1959   J. V. WILLIFORD   2,870,352
ROTOR FOR ELECTRIC MOTOR
Filed Aug. 3, 1956   5 Sheets-Sheet 3

INVENTOR.
JACOB V. WILLIFORD
BY Harold J. Downes
ATTORNEY

Jan. 20, 1959    J. V. WILLIFORD    2,870,352
ROTOR FOR ELECTRIC MOTOR
Filed Aug. 3, 1956    5 Sheets-Sheet 4
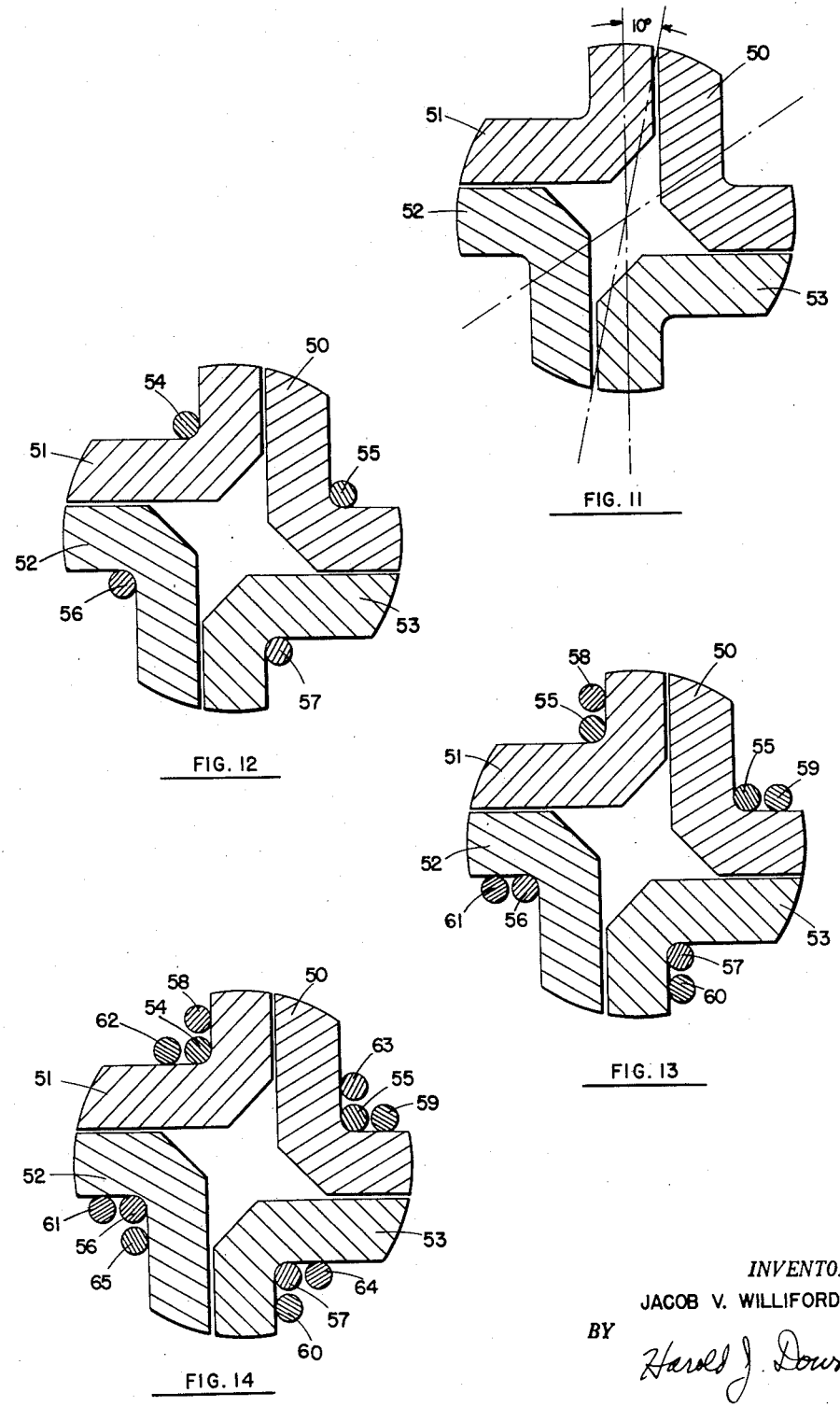
INVENTOR.
JACOB V. WILLIFORD
BY
Harold J. Downes
ATTORNEY Jan. 20, 1959  J. V. WILLIFORD  2,870,352
ROTOR FOR ELECTRIC MOTOR
Filed Aug. 3, 1956  5 Sheets-Sheet 5
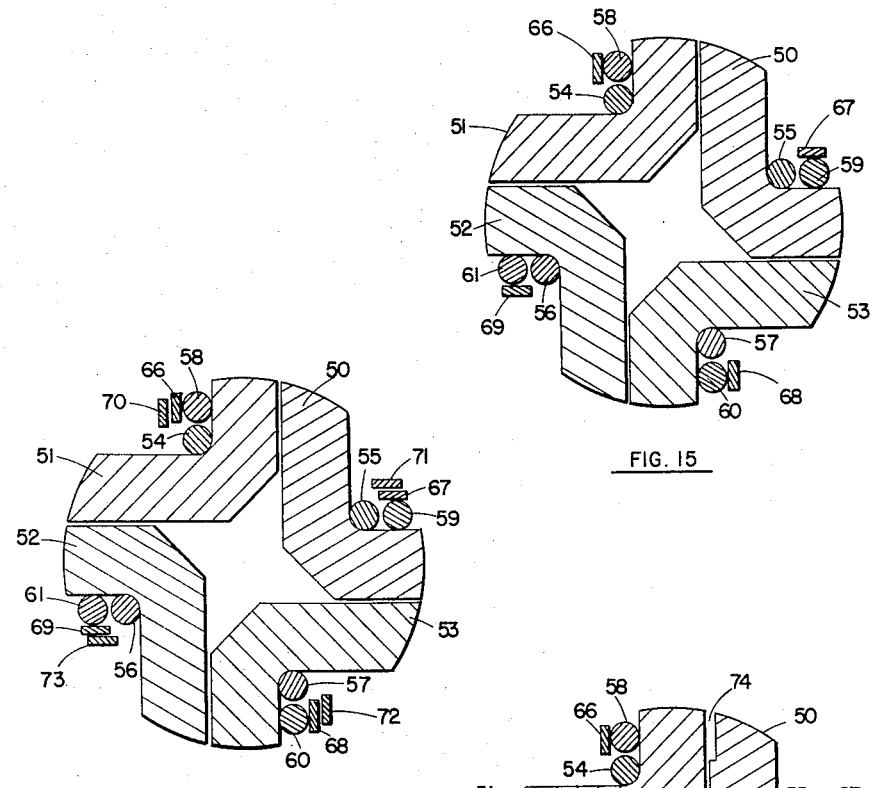
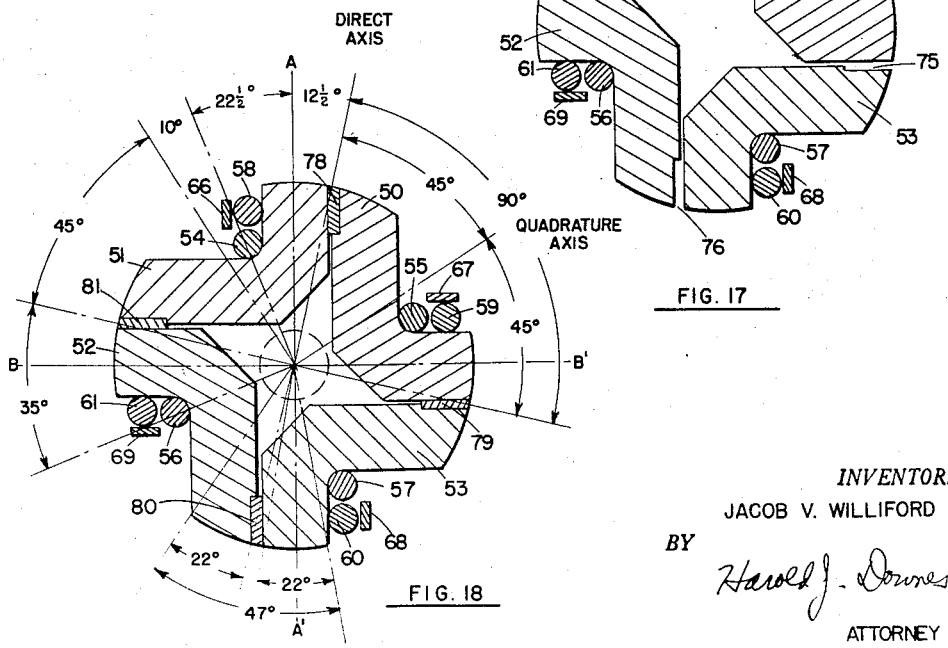
INVENTOR.
JACOB V. WILLIFORD
BY
Harold J. Downes
ATTORNEY United States Patent Office 2,870,352
Patented Jan. 20, 1959

2,870,352

ROTOR FOR ELECTRIC MOTOR

Jacob V. Williford, Costa Mesa, Calif.

Application August 3, 1956, Serial No. 601,868

10 Claims. (Cl. 310—162)

This invention relates to electric motors and in particular to a rotor for rotating field electric motor.

The classified problems encountered in the design and operation of synchronous motors is that of providing sufficient torque to carry substantial load during the period when the motor is accelerating from near synchronous speed to full synchronous speed. Synchronous motors are commonly provided with heavy shorting bar conductors cutting the rotating magnetic field of the stator and providing heavy torque for starting and acceleration. This torque is called induction torque since the principle of operation employed is that of an induction motor. The heavy copper strips cutting the lines of force created by the rotating field provide tangential force upon the rotor which in turn is converted into torque of the rotor. As the rotor approaches synchronous speed however, the number of such magnetic lines of force cut per unit time is reduced as the difference between the rotor speed and the synchronous speed is reduced, with the result that the torque supplied in this induction fashion is greatly reduced. Therefore in the conventional synchronous motor, at speeds within a few percent of synchronous speeds, the torque upon the rotor, capable of carrying load, is relatively low. This torque is commonly denoted "pull-in" torque.

After the rotor has reached synchronous speed, that is, when the rotor is physically rotating in synchronism with the electrically rotating but physically stationary field, the magnetic poles upon the rotor are kept in step with the rotating poles of the stator by simple reluctance. This is in accordance with the well-known principle that magnetizable bodies tend to achieve positions which minimize reluctance to the magnetic fields. At synchronism, since the rotor is completely in step with the rotating field, there is no current induced in the shorting bars or induction rotor windings so that no torque is contributed by these windings.

The critical period of operation to be considered here is that period during acceleration when the speed of the rotor is within a few revolutions per minute of the angular velocity of the rotating field, say from 1700 R. P. M. upward in an 1800 R. P. M. synchronous motor.

This invention contemplates a placement of rotor elements such as to substantially improve the pull-in torque characteristics of a synchronous motor. It further contemplates a rotor in which the pole pieces are entirely separated or segmented in a novel manner.

It is therefore an object of this invention to provide an improved synchronous motor rotor.

It is another object of this invention to provide a synchronous motor rotor having improved pull-in and pull-out torque characteristics.

Figure 3:
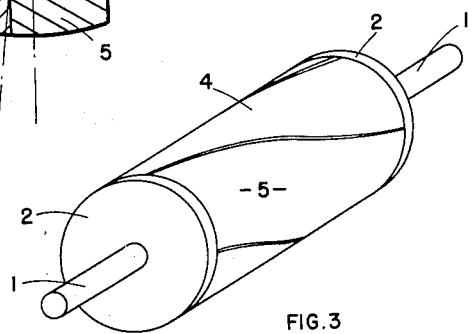
Figure 2:
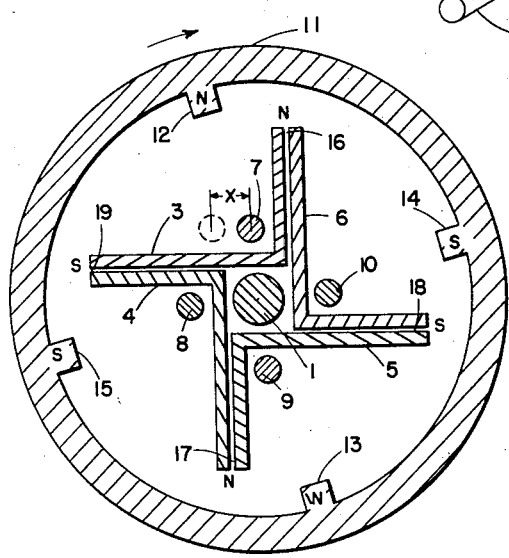

Other objects of invention will become apparent from the following description taken in connection with the accompanying drawings, in which:

Fig. 1 is a sectional view taken perpendicular to the shaft of the rotor of this invention, Fig. 2 is a schematic drawing of a sectional view of the invention, Fig. 3 is a perspective view of the rotor of this invention, Figs. 4–10 are sectional views of rotor #1 of this invention with various squirrel cage configurations, and Figs. 11–18 are sectional views of rotor #2 of this invention with various squirrel cage configurations.

Referring now to the drawings there is shown a shaft 1 to which are attached conductive circular end plates 2, which in turn support and carry pole pieces 3, 4, 5 and 6. It will be noted that these pole pieces are each of generally L shape and that adjacent legs of adjacent L's, though separated, make up each pole of the rotor. Extending between end plates 2 are conductive bars 7, 8, 9 and 10 constituting a squirrel cage, which serves as induction elements during acceleration of the rotor. Surrounding the rotor is a conventional rotating field stator which is appropriately wired in a conventional manner to provide a rotating alternating current field from a source of alternating current, either single or polyphase.

It will be noted from an inspection of Fig. 1 that pole pieces 3, 4, 5 and 6 are L shaped with one leg of the L longer than the other and are somewhat distorted from the standpoint of symmetry so that they are symmetrical about the center of rotation of the shaft upon which they are mounted for rotation but are not symmetrical about any diametrical plane intersecting the shaft. All of the pole pieces are identical but the "back" of the L of none of the pole pieces lies along a radial line from the center of the shaft. The amount by which the placement of these pole pieces departs from symmetry is denoted the chord angle and may vary from about 3 degrees to 15 degrees, measured from the center of shaft 1 by a diametral line parallel to the slots between adjacent pole pieces and a line drawn through the center of the slot between pole pieces at their periphery and the center of the shaft. Conductors 7, 8, 9 and 10 are nested in the "pocket" within their respective pole pieces and are likewise positioned from 3 to 15 degrees away from their corresponding position if pole pieces 3, 4, 5 and 6 were symmetrically disposed about any diametral plane intersecting the shaft. Conductors 7, 8, 9 and 10 may be replaced by a greater number of conductors variously distributed within the "pocket" of each pole piece but having their centroid at the position shown for conductors 7, 8, 9 and 10 in Fig. 1.

Thus it is seen that the rotor is completely segmented into four separate pieces. The rotor iron may be built of four solid pieces or may be built up of laminations bound or clamped together in any conventional manner and attached to the end plates. Segmentation of the rotor has the effect of reducing the quadrature axis reactance without materially affecting the direct axis reactance inasmuch as the quadrature axis reactance is proportional to quadrature axis flux and segmentation of the rotor tends to increase quadrature axis reluctance which causes a reduction in flux. The reduction of quadrature axis reactance improves the pull-out torque characteristics of the motor of this invention.

Referring now to Fig. 2 a virtual schematic of the device shown in Fig. 1 is depicted. In Fig. 2 the conventional rotating electro-magnetic field of the stator is replaced for explanatory purposes by a permanent magnet rotating field piece 11 which has, for the purposes of explanation, all of the characteristics of a rotating electro-magnetic field which is commonly found in synchronous motors. In Fig. 2 north poles 12 and 13 and south poles 14 and 15 are shown in a rotative position at which, during the relatively slow relative rotation which is present at or near pull-in in a synchronous motor, the conductors 7, 8, 9 and 10 are being cut by a maximum number of magnetic lines of force from the pole pieces. These lines of force are depicted in connection with pole piece 12 but for convenience sake have been omitted in connection with the other permanent magnet pole pieces. Pole pieces 3, 4, 5 and 6 have north poles 16 and 17 and south poles 18 and 19, as shown. At the outset it must be observed that since pole pieces 3, 4, 5 and 6 are permeable iron of a magnetizable but not permanently magnetized nature, the polarities indicated in Fig. 2 for poles 16, 17, 18 and 19 are achieved only because of current flow induced in conductors 7, 8, 9 and 10. This current flow is induced by the cutting of magnetic lines of force of pole pieces 12, 13, 14 and 15. Now at the instant under consideration, which is depicted in Fig. 2, these magnetic lines of force are being cut at a maximum rate. By way of explanation it should be noted that if one would plot the current flowing in any of conductors 7, 8, 9 or 10 against time, the resultant plot would be of alternating form, that is current flows first in one direction, for example in conductor 7, and then in the other direction. The wave form achieved is a function of many design parameters of the particular motor under consideration but for practical purposes is generally considered to be roughly sinusoidal, though this form may be radically modified by the shape of the pole pieces and other factors. In the motor herein disclosed, the said wave shape is more nearly square than sinusoidal because of the shape of the pole pieces and the fact that the different pole pieces are physically isolated from each other. However, it must be stipulated that no matter what the wave form of current flow in these conductors, there exists a point in time when said current flow is at a maximum. In general this maximum current flow occurs at about the time when a stator pole passes the conductor under consideration. With a maximized current flow in conductors 7, 8, 9 and 10, the induced magnetism in pole pieces 16, 17, 18 and 19 is made a maximum. When this induced magnetism is at a maximum in pole pieces 16, 17, 18 and 19, there is a maximum of torque-producing interaction between the rotor pole pieces and the rotating field pole pieces. Accordingly, the torque forcing the rotor to drop into step rotatively with the stator is maximized if the pole pieces are shaped as shown in Fig. 1, and, as somewhat exaggerated in Fig. 2, the gap between adjacent interacting pole pieces on the stator and rotor respectively is somewhat minimized. If this gap is at a minimum when the magnetization produced in the rotor poles by induced current in windings 6, 7, 8 and 9 is at a maximum, maximum rotor torque conducive to pulling the rotor into synchronism with the rotating field of the stator is produced.

Use of the rotor with the arrangement of elements shown in Fig. 1 results in a substantial improvement in pull-in torque characteristics. As shown in the table presented hereinafter this improvement is effected in comparison to that which is attained by the use of symmetrical pole pieces of the same general shape as shown in Fig. 1. In other words, the distortion of the pole pieces shown in Fig. 1, together with the placement of the conductors therein shown, results in higher pull-in torque because maximum magnetization of the rotating poles of the rotor is achieved at the most propitious time and position of rotating of the rotating stator field to produce maximum torque upon the rotor. The distortion of the pole pieces results in an effective shifting of the relative position of conductor 7 in Fig. 2 by a small increment X. If the conductor had remained in the position shown in dotted lines in Fig. 2, it can be seen that at the moment of maximum induced current in the conductor and hence maximum strength of pole piece 16, field pole piece 12 would have been more distant from rotating rotor pole piece 16 than is shown in Fig. 2.

Accordingly the magnetic forces tending to torque the rotor would have been weaker.

It should be noted in accordance with the foregoing that conductors such as 7, 8, 9 and 10 provide current paths which are effective to magnetize the rotating pole pieces of the rotor. The actual magnetization of the rotor is produced both by induction from the current paths and by the presence of the stator pole pieces. When both these magnetic effects are caused to reinforce each other as in this invention, pull-in torque is maximized.

The placement of these current paths may be varied somewhat within the "pockets" provided within the pole pieces. However, the number and size of these conductors and their placement must be such that the centroid of the conductors, that is the effective position of the current path, is closer to one end of a pole piece, such as pole piece 3 in Fig. 1, than the other. The important element thus is the relation between the conductor and its nearest adjacent pole, for when the rotating pole of the stator is at a position to induce maximum current in the conductor and hence produce maximum magnetization of the rotor pole piece, the rotor pole piece and the stator pole piece must be closer than half the distance between adjacent rotor pole pieces. If this condition obtains, an improvement in pull-in torque is realized over and above that which would be obtained if the centroid of the conductors, that is, the position of the effective current path for inducing magnetization in the rotor pole pieces, were exactly equidistant from adjacent rotor poles.

To confirm the influence of pole piece distortion and squirrel cage conductor placement upon the various performance characteristics of the motor of this invention, two rotors were constructed using identical shafts, identical end plates, and pole pieces of exactly the same iron content (weight). Rotor 1 (illustrated in Figs. 4–10) had symmetrical unchorded pole pieces while rotor 2 (illustrated in Figs. 11–18) had pole pieces with a 10° chord angle measured as shown in connection with the rotor of Fig. 1. Using the same power source and under similar conditions the average lock torque, minimum lock torque, maximum lock torque, pull-in torque, and pull-out torque were measured. These quantities were measured without squirrel cage bars and with squirrel cage bars added in a variety of configurations as indicated in table below. The percentages given are based upon 100% as the full load rated torque of the motor.

Rotor #1

Figure 4:
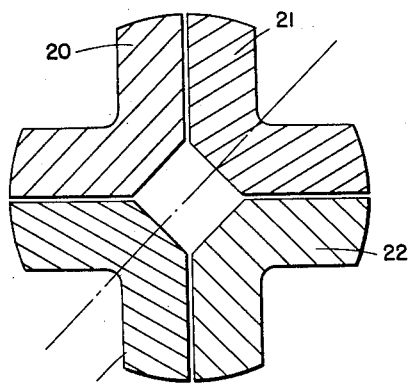
Figure 5:
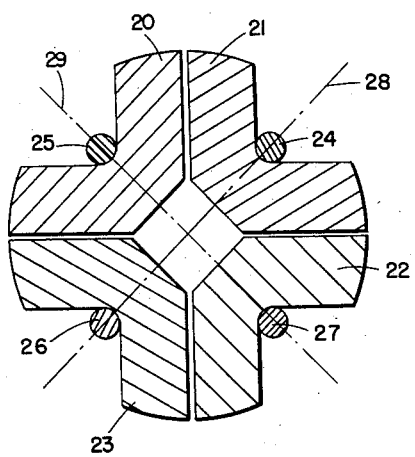
Figure 6:
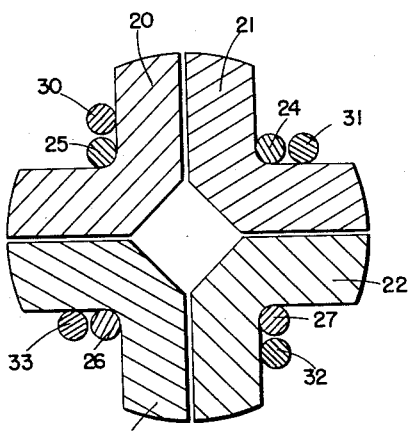
Figure 7:
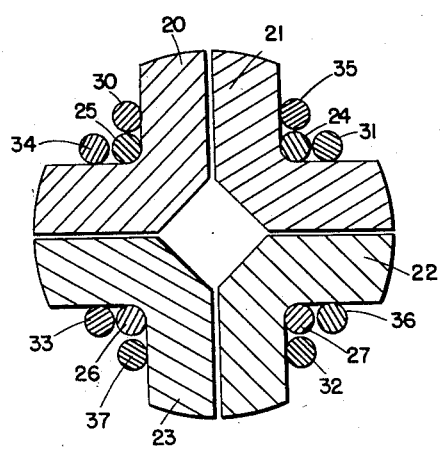
Figure 8:
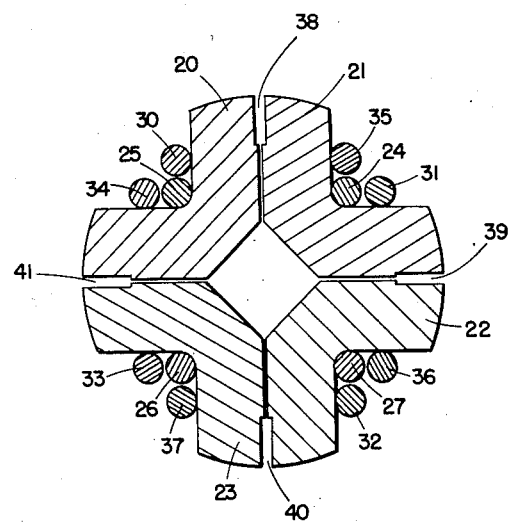
Figure 9:
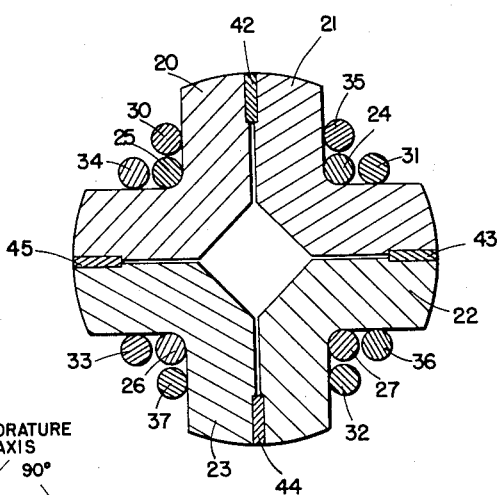
Figure 10:
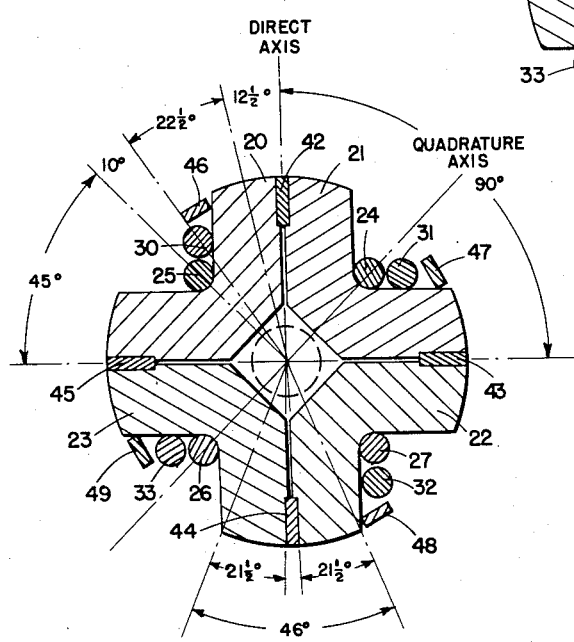

| Squirrel Cage Configuration | Average Lock Torque | Minimum Lock Torque | Maximum Lock Torque | Pull-in Torque | Pull-out Torque |
|---|---|---|---|---|---|
| | Percent | Percent | Percent | Percent | Percent |
| Fig. 4 | 334 | 277 | 382 | 17.7 | 183½ |
| Fig. 5 | 350 | 300 | 400 | 65 | 188½ |
| Fig. 6 | 350 | 250 | 400 | 100 | 196½ |
| Fig. 7 | 325 | 225 | 400 | 115 | 184 |
| Fig. 8 | 308 | 208 | 392 | 113 | 173 |
| Fig. 9 | 275 | 140 | 330 | 169 | 191 |
| Fig. 10 | 290 | 200 | 402 | 154 | 203 |

Rotor #2

| Squirrel Cage Configuration | Average Lock Torque | Minimum Lock Torque | Maximum Lock Torque | Pull-in Torque | Pull-out Torque |
|---|---|---|---|---|---|
| | Percent | Percent | Percent | Percent | Percent |
| Fig. 11 | 358 | 286 | 382 | 17.7 | 177½ |
| Fig. 12 | 342 | 342 | 440 | 70.5 | 188½ |
| Fig. 13 | 400 | 300 | 475 | 123 | 222 |
| Fig. 14 | 382 | 238 | 430 | 113.8 | 208 |
| Fig. 15 | 374 | 280 | 467 | 124 | 205 |
| Fig. 16 | 350 | 250 | 400 | 118 | 188½ |
| Fig. 17 | 382 | 334 | 430 | 129½ | 191 |
| Fig. 18 | 350 | 200 | 500 | 177 | 211½ |

It is apparent from the foregoing data that improved operating characteristics are achieved by placing the conductors unsymmetrically (i. e. against one pole piece) with either the symmetrical or unsymmetrical pole piece rotor (rotor 1 or 2). It is apparent further that a motor with exceptionally good characteristics is achieved both with and without distortion of the pole pieces.

The last two tabulated tests show the effect of adding a squirrel cage bar between adjacent pole pieces in conjunction with squirrel cage bars adjacent one of said pole pieces. This constitutes a single shorted turn around a single pole of each pole group or what might be termed a shaded pole rotor.

Referring now in detail to Figs. 4 through 18, the rotor of Fig. 4 is made up of pole pieces 20, 21, 22 and 23 which are symmetrical L-shaped solid iron or built-up laminated pole pieces having legs of unequal length and a gap between adjacent pole pieces of approximately the same order of magnitude as the gap between the rotor and the stator. In the rotor of Fig. 4 no shorting bars or squirrel cage windings were employed, however, the pole pieces themselves were attached to end plates such as end plate 2 of Figs. 1 and 2 in identically the same manner as indicated in Figs. 1 and 2. Such attachment is normally effected by welding, brazing or silver soldering the pole pieces to the end plates. Since shaft 1, not shown in any of Figs. 4 through 18 for the sake of convenience, is attached to the end plates but clears the inner radial extension of the pole pieces no connection between pole pieces is made by the shaft. As can be observed from the tabulated results of the test upon rotor #1, in the configuration illustrated in Fig. 4, the pull-in and pull-out torque for the rotor are definitely inferior.

Referring now to Fig. 5, the rotor of Fig. 4 was modified by the placement in symmetrically disposed positions of a single squirrel cage bar in each pocket of each pole piece. The squirrel cage bar in each case is located on a radial line extending from the center of the rotor, which line makes an angle of 90° with a similar line drawn through the next adjacent squirrel cage bar at an angle of 45° with a radial line bisecting the space between adjacent pole pieces. Accordingly, the four squirrel cage bars are symmetrically exposed about the rotor and are exactly on the quadrature axes of the rotor. Thus conductors 24, 25, 26 and 27 are disposed respectively on axes 28 and 29 as shown, which axes bisect pole pieces 20 through 23 as indicated in Fig. 5. The result of the test of this rotor was a substantially improved pull-in torque with a slight improvement in minimum, maximum and average lock torque and pull-out torque.

Referring now to Fig. 6, a second set of squirrel cage bars was added, which set of bars was identical in size to those denoted by numerals 24 through 27 in Figs. 5 and 6. Additional squirrel cage bars 30, 31, 32 and 33 were disposed against corresponding legs of pole pieces 20, 21, 22 and 23 as shown, so that the effective centroid of the conductive path represented by the combination of squirrel cage conductors was displaced from a center position between adjacent pole pieces. The result of this test as shown in the table labeled rotor #1 above, indicates a substantial improvement in pull-in torque, pull-out torque, without any appreciable important loss in average lock torque characteristics.

In Fig. 7, additional squirrel cage bars 34, 35, 36 and 37 were added to make the squirrel cage cluster again symmetrical as shown in Fig. 7. The results of this test are tabulated in the table above and indicate a slight improvement in pull-in torque, a slight deterioration in average lock torque and a slight deterioration in pull-out torque, thus indicating that it is preferable to keep the squirrel cage conductors unsymmetrically disposed with respect to the pole tips.

The rotor of Fig. 8 is identical to that of Fig. 7 except that anti-hunt bar slots 38, 39, 40 and 41 have been cut in the rotor as shown. A slight deterioration in all characteristics is noted for this test.

In Fig. 9, anti-hunt bars 42, 43, 44 and 45 have been added but with the same squirrel cage cluster configuration utilized in Figs. 7 and 8. The results of this test show a further deterioration in average lock torque but a substantial improvement in pull-in torque and pull-out torque with fairly good all around performance.

In Fig. 10, the configuration of Fig. 6 squirrel cage bars is utilized but with anti-hunt bars 42, 43, 44 and 45 added and strips 46, 47, 48 and 49 placed near the gap between stator and rotor. The larger bars of the squirrel cage pattern are concentrated near one leg of the L-shaped pole pieces to achieve the effect discovered in connection with this invention, namely that of improved pull-in torque, pull-out torque and lock torque. The result of this test indicates that the average lock torque, minimum lock torque and maximum lock torque are substantially improved without a marked decrease in pull-in torque or pull-out torque in comparison to the previous test. An outstanding motor is thus achieved with a 290% average lock torque, a 154% pull-in torque and a 203% pull-out torque.

Referring now to Figs. 11 through 18, the tests of rotor #2, that is the unsymmetrical rotor, are disclosed. In the rotor of Fig. 11, pole pieces 50, 51, 52 and 53 are shown without squirrel cage bars in a test corresponding to that indicated by Fig. 4 in the test of rotor #1. The tests of this configuration, as can be noted from the table, yielded results not markedly different from that of the configuration of Fig. 4.

Turning now to Fig. 12, squirrel cage bars 54, 55, 56 and 57 were added in the pocket of their respective pole pieces. The results of this test indicate a greater improvement in pull-in and maximum lock torque than the corresponding addition in the case of rotor #1.

In Fig. 13, conductors 58, 59, 60 and 61 were added against the short leg of the L of each pole piece as shown. The results of this test show a further improvement in average lock torque, pull-in torque and pull-out torque and a substantial improvement over the test of the configuration of Fig. 6, which corresponds to this test with the symmetrical rotor. In other words, the results of this test indicate conclusively that the chorded rotor, that is rotor #2, yields higher lock torque and higher pull-in and pull-out torque than its opposite number with symmetrical pole pieces of the same weight and with the same size and number of squirrel cage conductors. The significance of this statement and the result represented thereby is explained hereinbefore in connection with Fig. 2 of the drawing, which is a distorted view of an idealized rotor drawn to explain the effect of rotor pole piece distortion and displacement of the squirrel cage bars from a centered position between adjacent pole pieces.

Referring now to Fig. 14, additional conductors 62, 63, 64 and 65 were added to produce a substantially symmetrical cluster of squirrel cage bars. The centroid of these bars of course is not centered between adjacent pole pieces; however they are nearer to being centered between adjacent pole pieces than a configuration of Fig. 13, and the results of the test indicated in the tabulation of results of tests of rotor #2 in line 4 indicate a slight deterioration in minimum, maximum and average lock torque and in pull-in and pull-out torque as compared to the configuration shown in Fig. 13.

In Figs. 15 and 16, additional squarrel cage strips 66, 67, 68, 69, 70, 71, 72 and 73 were added as shown with no significant increase in desirable torque characteristics.

In Fig. 17, a squirrel cage configuration of Fig. 15 was utilized but slots 74, 75, 76 and 77 were cut to receive anti-hunt bars. No substantial change in characteristics was noted because of this modification.

In Fig. 18, anti-hunt bars 78, 79, 80 and 81 were added and the squirrel cage configuration of Fig. 15 was utilized. With this configuration the test results appeared to be substantially equivalent to those of Fig. 15 except that the pull-in torque was substantially increased. This result would seem to indicate that the use of the anti-hunt bars, which in connection with the placement of the squirrel cage conductors effectively constitutes a shaded pole rotor, is responsible for achieving a substantial improvement in pull-in torque without a corresponding deterioration in lock torque or pull-out torque. Furthermore, a comparison of test results of the configuration shown in Fig. 18 with the configuration shown in Fig. 10, shows in a striking manner the improvement obtained by distortion of the pole pieces by chording them.

It should be noted in the foregoing tests that all of the configurations shown in Figs. 11 through 18 utilized the same pole pieces and end plates as well as the same shaft and stator and the same size conductors were utilized throughout as indicated in the figures. Other tests have indicated that the benefits of chording the pole pieces are achieved though the magnitude thereof may be varied from 3 to 15 degrees. An upper limit of about 15° is reached because it is necessary to provide a certain amount of space for the squirrel cage conductors and if chording of too great a magnitude is undertaken, the space for the squirrel cage conductors is virtually eliminated. On the other hand unless some chording is accomplished, say in excess of 3°, the results of symmetrical pole piece rotor, as shown in the tests of rotor #1, are achieved.

Each squirrel cage bar in all tests was 5/16" in diameter and anti-hunt bars were 1/8" x 1/2" rectangular. The pole pieces were made of 3/4" thick stock and the rotors were 4" in diameter. Placement of rotor squirrel cage elements is indicated in Figs. 10 and 18 as are quadrature and direct axes with respect to rectangular axes AA' and BB'.

Although the invention has been described and illustrated in detail, the same is to be understood to be by way of illustration and example only, the spirit and scope of the invention being limited only by the terms of the appended claims.

I claim:

1. A synchronous motor rotor having a shaft and four salient poles, each pole comprising a pair of substantially thick spaced magnetic plates arranged generally parallel to the rotor axis, the plate on one side of each pole being magnetically integrally connected to an adjacent plate on an adjacent pole by a substantially arcuate plate having its concave surface facing outwardly, a squirrel cage winding on the rotor comprising a pair of axially spaced disks of electrically conductive material on the shaft and connected together by groups of conductor bars, said groups of bars being located one group in each concavity of the outwardly facing arcuate plates, each said group of bars being disposed nearer one respective adjacent pole than the other respective adjacent pole.

2. A synchronous motor rotor having a shaft and four salient poles, each pole comprising a pair of substantially thick spaced magnetic plates arranged generally parallel to the rotor axis, a plate on one side of each pole being magnetically integrally connected to an adjacent plate on an adjacent pole by a substantially arcuate plate having its concave surface facing outwardly, a squirrel cage winding on the rotor comprising a pair of axially spaced disks of electrically conductive material on the shaft and connected together by groups of conductor bars, said groups of bars being located one group in each concavity of the outwardly facing arcuate plates, said groups of bars being displaced from a symmetrical position with respect to said poles by from 3° to 15° and all said groups of bars being displaced in the same direction.

3. A device as recited in claim 2 in which said pole pieces are distorted so that adjacent surfaces thereof are angularly displaced from a radial thereto by from 3° to 15°.

4. A synchronous motor rotor comprising a shaft, a generally cylindrical magnetizable mass segmented into four spaced generally L-shaped members forming pole pieces at their adjacent ends, a squirrel cage winding comprising a pair of conductive circular plates joining the ends of said pole pieces to said shaft, and conductor bars disposed at least one between each pair of said pole pieces and lying more nearly adjacent one of the pole pieces of each of said pairs than to the other pole piece.

5. A device as recited in claim 4 and further comprising a conductor disposed in the space between the ends of the legs of said members at their periphery.

6. A device as recited in claim 4 in which said pole pieces are built up from flat laminations arranged axially along said shaft.

7. A device as recited in claim 4 in which said pole pieces are distorted so that adjacent surfaces thereof are angularly displaced from a radial thereto by from 3° to 15°.

8. A synchronous motor comprising an alternating current rotating field stator, a shaft, a rotor comprised of an even number greater than two of generally L-shaped magnetizable pole pieces separated from each other by a distance not greater than twice the gap between rotor and stator, said L-shaped pole pieces being equally spaced about said shaft with the legs thereof extending outwardly therefrom to form pole tips in proximity to said stator, circular conductive plates attached to the ends of said pole pieces and to said shaft, and conductors joining said end plates in the pockets formed by said pole pieces, said conductors of each pocket being disposed more closely adjacent the same corresponding leg of each L-shaped pole piece than to the other leg thereof.

9. A device as recited in claim 8 and further comprising a conductor between each pair of pole piece tips at their periphery.

10. A device as recited in claim 8 in which said pole pieces are distorted so that the radially extending legs thereof are angularly chorded by from 3° to 15°.

References Cited in the file of this patent

UNITED STATES PATENTS

| | | |
|---|---|---|
| 1,551,271 | Slepian | Aug. 25, 1925 |
| 2,483,848 | Saretzky | Oct. 4, 1949 |